(12) United States Patent
Watanabe et al.

(10) Patent No.: US 9,330,687 B2
(45) Date of Patent: May 3, 2016

(54) MICROWAVE-ASSISTED RECORDING HEAD WITH STABLE OSCILLATION

(71) Applicant: HGST Netherlands B.V., Amsterdam (NL)

(72) Inventors: Katsuro Watanabe, Ibaraki (JP); Yohji Maruyama, Saitama (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/055,769

(22) Filed: Oct. 16, 2013

(65) Prior Publication Data
US 2015/0103437 A1    Apr. 16, 2015

(51) Int. Cl.
| G11B 5/00 | (2006.01) |
| G11B 5/02 | (2006.01) |
| G11B 5/127 | (2006.01) |
| G11B 5/31 | (2006.01) |
| G11B 5/40 | (2006.01) |

(52) U.S. Cl.
CPC ............... *G11B 5/02* (2013.01); *G11B 5/1278* (2013.01); *G11B 5/3133* (2013.01); *G11B 5/3146* (2013.01); *G11B 5/40* (2013.01); *G11B 2005/0024* (2013.01)

(58) Field of Classification Search
CPC ...... G11B 5/3945; G11B 5/3146; G11B 5/40; G11B 2005/0024; G11B 5/02; G11B 5/1278; G11B 5/3133

USPC ............................................. 360/128
See application file for complete search history.

(56) References Cited

U.S. PATENT DOCUMENTS

| 7,791,829 | B2 | 9/2010 | Takeo et al. | |
| 8,027,118 | B2 | 9/2011 | Ezawa et al. | |
| 8,264,916 | B1 | 9/2012 | Aoyama et al. | |
| 2010/0033881 | A1* | 2/2010 | Carey et al. | 360/324.11 |
| 2010/0142088 | A1 | 6/2010 | Iwasaki et al. | |
| 2011/0038080 | A1 | 2/2011 | Alex et al. | |
| 2012/0113542 | A1 | 5/2012 | Igarashi et al. | |
| 2012/0243127 | A1* | 9/2012 | Iwasaki et al. | 360/290 |

OTHER PUBLICATIONS

"Spin torque oscillator with negative magnetic anisotrophy materials for MAMR", http://ieeexplore.ieee.org/stamp/stamp.jsp?tp=&arnumber=5467471&isnumber=5467355.

* cited by examiner

*Primary Examiner* — Gustavo Polo
(74) *Attorney, Agent, or Firm* — Alleman Hall McCoy Russell & Tuttle LLP (57) ABSTRACT

A magnetic recording head for microwave-assisted magnetic recording is disclosed. In one embodiment, a magnetic recording head is for applying a magnetic field from a main pole of said magnetic recording head for recording data to a disk. Further comprising a spin torque oscillator adjacent to said magnetic recording head and is for generating a high-frequency magnetic field at a stable frequency and amplitude. Further comprising a capacitor connected to an upper electrode of said spin torque oscillator via a first resistor and a lower electrode of said spin torque oscillator via a second resistor.

20 Claims, 9 Drawing Sheets

MICROWAVE-ASSISTED RECORDING HEAD WITH STABLE OSCILLATION

TECHNICAL FIELD

Embodiments of the present technology relate to a magnetic recording head and a magnetic recording apparatus for recording information in which magnetization reversal is enhanced by applying a high-frequency assisted magnetic field to a magnetic recording medium to induce the magnetization precession in the magnetic recording medium.

BACKGROUND

The evolution of a sophisticated information society over recent years has been accompanied by a significant rise in the quantity of information handled across society. This evolution has necessitated the development of information storage devices in the form of magnetic recording/reproducing devices with the capacity to input and output a large quantity of data at high speed of which a typical example is a hard disk device. While the recording density of hard disk devices has continued to increase unabated as result of the introduction of perpendicular recording techniques and improvements thereto and, at the current point in time, the recording density of hard disk devices has reached a limit. The thermal fluctuation of the magnetic recording medium has become a gradual problem. While increasing the anisotropy energy of the magnetic recording medium has been found to provide an effective means for obviating this problem, the use of magnetic heads of a narrow width correspondent to a high recording density precludes the generation of an adequate recording magnetic field which, in turn, inhibits recording. The significance of this problem is the reason why there exists a realistic recording density limit. For example, this limit may be 1 Tb/in$^2$.

BRIEF DESCRIPTION OF THE DRAWINGS

The accompanying drawings, which are incorporated in and form a part of this specification, illustrate embodiments of the present technology and, together with the description, serve to explain the embodiments of the present technology.

The drawings referred to in this description should not be understood as being drawn to scale except if specifically noted.

DESCRIPTION OF EMBODIMENTS

Reference will now be made in detail to the alternative embodiments of the present technology. While the technology will be described in conjunction with the alternative embodiments, it will be understood that they are not intended to limit the technology to these embodiments. On the contrary, the technology is intended to cover alternatives, modifications and equivalents, which may be included within the spirit and scope of the technology as defined by the appended claims.

Furthermore, in the following description of embodiments of the present technology, numerous specific details are set forth in order to provide a thorough understanding of the present technology. However, it should be noted that embodiments of the present technology may be practiced without these specific details. In other instances, well known methods, procedures, and components have not been described in detail as not to unnecessarily obscure embodiments of the present technology. Throughout the drawings, like components are denoted by like reference numerals, and repetitive descriptions are omitted for clarity of explanation if not necessary.

Overview

Research into energy-assisted recording techniques with the object of forging a breakthrough technology for surmounting this 1 Tb/in$^2$ barrier and achieving even higher recording densities has been carried out, and one example of such technologies is Microwave Assisted Magnetic Recording (MAMR). In MAMR, magnetic recording in the target recording region in a magnetic recording media with large magnetic anisotropy is performed by applying both a magnetic field from a perpendicular magnetic recording head and a high-frequency magnetic field from a an adjacent spin torque oscillator (STO). Here, the high-frequency magnetic field enhances the magnetization precession in media and reduces a magnetic reversal field.

In one embodiment, in MAMR, a high-frequency magnetic field is to be stably generated from an STO and superimposed on the recording magnetic field from the perpendicular recording head. One solution disclose a technique for controlling either the timing or the magnitude of the recording magnetic field from the perpendicular recording head and the high-frequency magnetic field generated from the STO using a read/write IC.

Various solutions disclose techniques for superimposing the recording magnetic field from the main pole of the magnetic head and the high-frequency magnetic field from the spin torque oscillator based on the supply of a drive signal of a level higher than the steady-state level to the spin torque oscillator for a fixed time only following the polarity change of a write signal supplied to a coil for exciting the main pole. In addition, one solution discloses a technique in which the locally-conferring energy to the recording region of the magnetic recording medium is set to be larger during polarity change, in which the recording current decreases, than at times other than during the polarity change of the recording current so as to ensure a larger reduction in the magnetization reversal field during polarity change than at other times. However, while these described solutions afford a control of the timing for applying the magnetic recording field and the high-frequency magnetic field, they render it difficult to ensure stable oscillation of the high-frequency magnetic field. Notably, a stable high-frequency magnetic field suggests stability of the oscillation frequency, and stability of the magnetic field intensity.

It is an object of the present technology to provide a microwave-assisted magnetic recording head comprising an STO which is able to generate a high-frequency magnetic field with a stable frequency and amplitude, and it is a further object of the present technology to provide a magnetic storage apparatus in which a microwave-assisted magnetic recording mechanism having a high signal to noise ratio (SNR) or high areal recording density is mounted.

Description of Embodiments of the Present Technology for Microwave-Assisted Magnetic Recording Head with Stable Oscillation Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
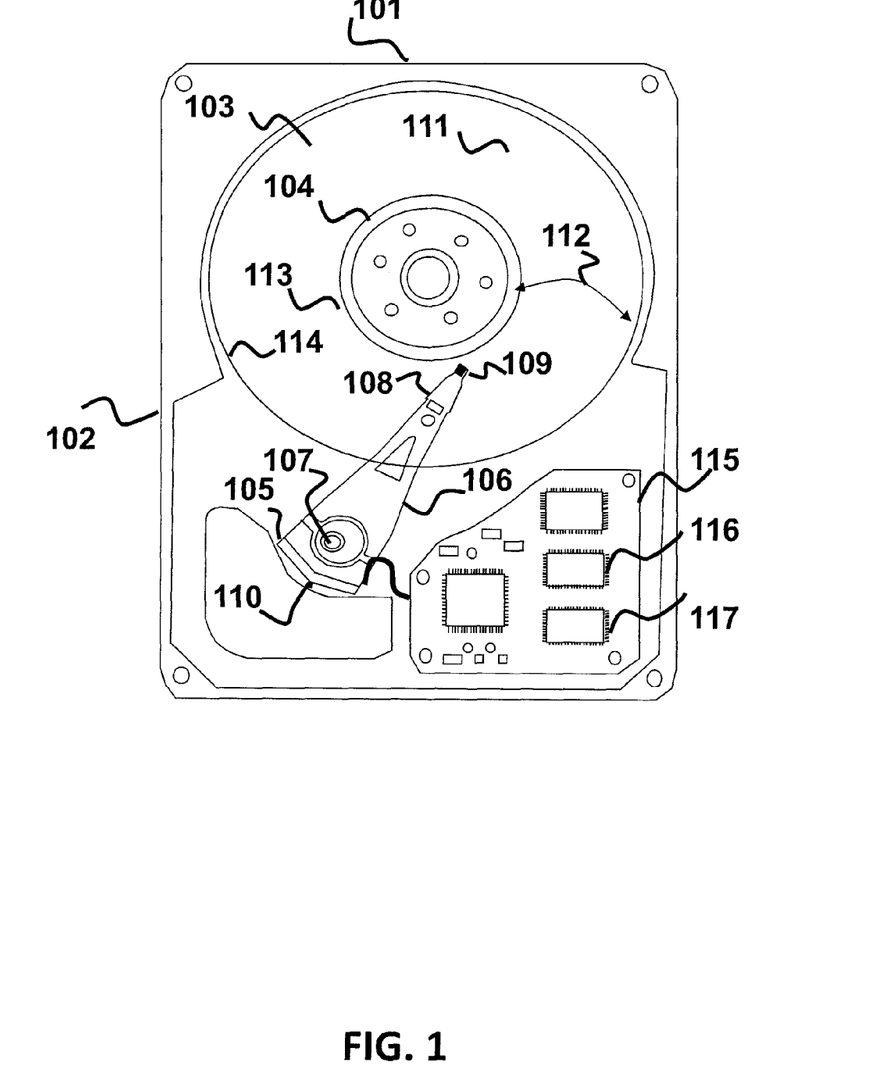
FIG. 1 illustrates an example of a HDD, in accordance with an embodiment of the present invention.

In one embodiment, a disk drive used in conjunction with the present technology is a hard disk drive (HDD). FIG. 1 is a block diagram showing the overall construction of the HDD 101. The HDD 101 comprises a printed circuit board 115 that is fixed to the inside of a hard disk drive base 102. On the circuit board 115, there are mounted various circuits such as the hard disk controller 117 and arm electronics 116, comprising a read/write channel, motor drive unit 110, microprocessor unit (MPU) and logic circuits. The circuits are formed on a single IC, or packaged IC, or on different ICs, or packaged ICs.

HDD 101 has an outer housing or base 102 containing a disk pack having at least one media or magnetic disk 103. The disk or disks 103 are rotated by a spindle motor assembly having a central drive hub 104. An actuator 105 comprises a plurality of parallel actuator arms 106 (one shown) in the form of a comb that is movably or pivotally mounted to base 102 about a pivot assembly 107.

In the embodiment shown, a magnetic read/disk transducer or head is mounted on a slider 109 and secured to a flexure that is flexibility mounted to each suspension 108. The slider 109 is usually bonded to the end of suspension 108. Suspensions 108 have a spring-like quality, which biases or urges the air-bearing surface of the slider 109 against the disk 103 to cause the slider 109 to fly at a precise distance from the disk.

A voice coil motor, associated with motor drive unit 110, rotates actuator 105 with its attached sliders 109 to position sliders 109 over a desired data track along a path 112 between a disk inner diameter 113 and a disk outer diameter 114. A thin lubricant 111 is dip-coated onto the hard carbon overcoat of magnetic disk 103 to protect from friction, wear and corrosion. The rotating magnetic disk 103 drag air under the sliders 109, and the air passing beneath the air surface is compressed to causes the air pressure between the disk and the air bearing surface to increase, which creates a hydrodynamic lifting force that counteracts the load force provided by suspensions 108 and causes the slider to lift and fly above or in close proximity to the magnetic disk 103 surface.

In order to suppress fluctuations in the magnetic field intensity and the frequency of a high-frequency magnetic field with the object of performing stable microwave-assisted magnetic recording, the current flowing to the spin torque oscillator that generates the high-frequency magnetic field needs to be able to be stably supplied even during the recording operation.

This problem will be hereinafter considered with reference to a schematic diagram of a specific head structure. First, the structure of a perpendicular recording head and the structure of a microwave-assisted magnetic recording head will be compared with reference to FIGS. 2 and 3. These diagrams provide a cross-sectional view of the structures in a direction perpendicular to an air bearing surface 100, and show only the region of main configuration thereof. A lower shield layer 11, a read sensor 12 and an upper shield layer 13 are fabricated by way of an insulating layer on the slider substrate 10, and a sense current supplied from a read sensor power supply 15 flows from the upper shield layer 13 to the read sensor 12 through which it passes to the lower shield layer 11. It should be appreciated that the polarity of the read sensor power supply 15 may be inverted. A lower pole 20, which is provided thereon by way of an insulating layer, is electrically connected to the slider substrate by way of a lower pole grounding resistor 25. A heater for dynamic flying control 30 which is used to adjust the spacing from the magnetic recording medium and, furthermore, a main pole and yoke 40 around which a coil 35 connected to a coil power supply 36 is wound is provided thereon. The structure described hereabove is common to a perpendicular recording head (FIG. 2) and a microwave-assisted magnetic recording head (FIG. 3).

In a perpendicular recording head (FIG. 2), a trailing shield 41 and an upper pole 42 are laminated at the air bearing surface 100 side by way of a trailing edge magnetic gap on the main pole and yoke 40 and, at a section rearward from the ABS (to the right of FIG. 2), is connected by way of a back contact 43 to the main pole and yoke 40.

On the other hand, in a microwave-assisted magnetic recording head (FIG. 3), a spin torque oscillator 50 is arranged on the air bearing surface 100 side, and the trailing shield 41 and upper pole 42 are laminated thereon. There is no back contact at a section rearward from the ABS (right of FIG. 3), an STO power supply 51 is connected to the main pole and yoke 40 and the upper pole 42, and a voltage is applied to the spin torque oscillator 50.

Figure 2:
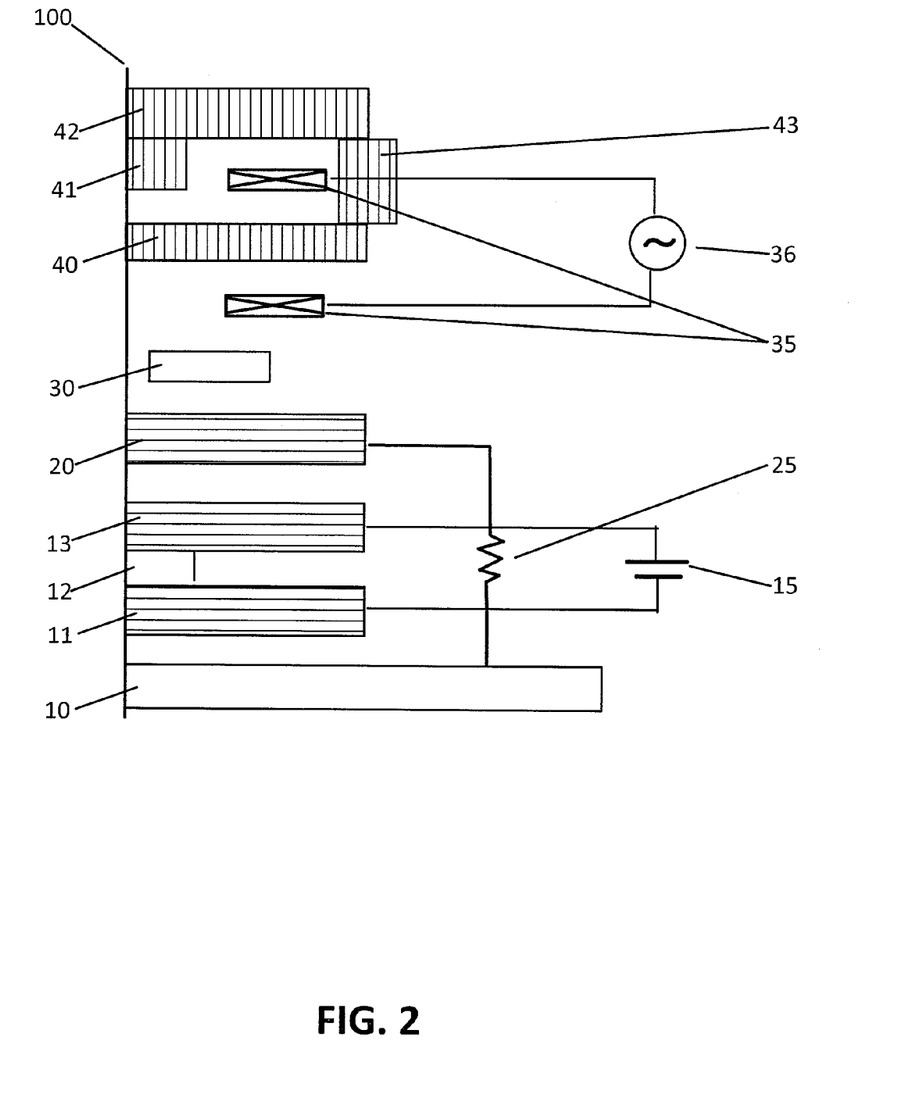
FIG. 2 illustrates an example of a perpendicular recording head.
Figure 3:
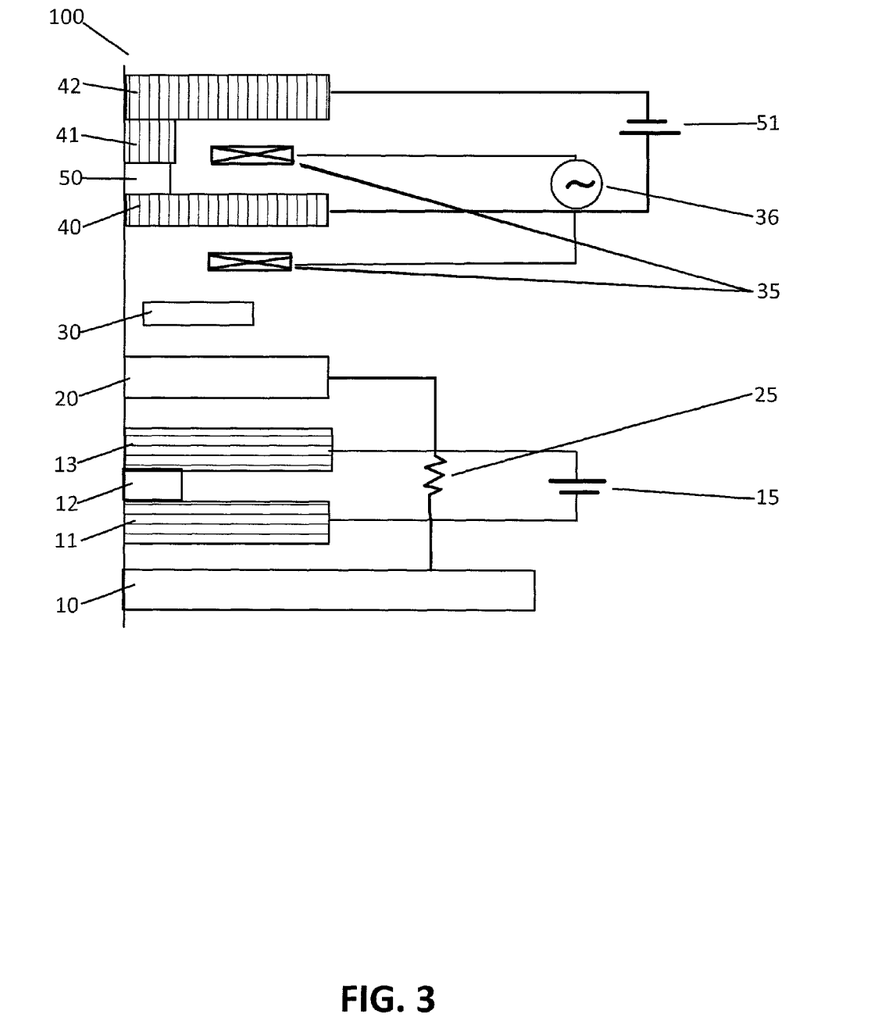
FIG. 3 illustrates an example of a perpendicular recording head and the structure of a microwave assisted magnetic recording feature.

While the arrangement of the coil 35 in this case is identical to that of the perpendicular recording head of FIG. 2, consideration is to be given to ensuring the stable operation of the spin torque oscillator 50 from an electrical standpoint, because the coil 35 to which the recording current flows lies in proximity of the upper and lower electrodes of the spin torque oscillator 50 and currents flow simultaneously to the spin torque oscillator 50 and the coil 35 at a recording operation.

Thereupon, in consideration of the problems pertaining to the structure of FIG. 3, because a high-frequency voltage is induced to the main pole and yoke 40 and to the upper pole 42 in proximity of the coil 35 when a high-frequency voltage is applied to the coil 35, this voltage is superimposed on the direct-current voltage applied to the spin torque oscillator 50 by the STO power supply 51. Because, from the standpoint of current normally encountered technical difficulties and costs, the difference between the high electric potential and low electric potential of the high-frequency voltage applied to the coil 35 is kept constant but no zero electric potential is prescribed, the electric potential of the coil 35 fluctuates over time. Accordingly, similar fluctuations occur in the voltage induced to the electrode of the spin torque oscillator 50, main pole and yoke 40 or upper pole 42, with accompanying the high-frequency coil 35 fluctuation.

In order to overcome this problem, a capacitor is to be provided in parallel with the spin torque oscillator 50 to release the thus-induced high-frequency voltage and, as a result, eliminate or reduce the effects of the high-frequency voltage applied to the main pole and yoke 40 and upper pole 42 that serve as the electrodes of the spin torque oscillator, and it is necessary that the direct-current voltage is applied principally from the STO power supply 51 to the spin torque oscillator 50.

In addition, parasitic capacitances of the main pole and yoke 40 and the upper pole 42 serving the electrode function of the spin torque oscillator 50, and these parasitic capacitances are charged by the recording voltage applied to the coil 35, and then voltage is generated. Because the difference between the voltage generated by the parasitic capacitance of the main pole and yoke 40 and the voltage generated by the parasitic capacitance of the upper pole 42 differ, this voltage difference is applied to the STO as a surplus voltage to the power supply voltage. At this time, because this voltage difference is generated as crosstalk occurred accompanying with the voltage variation applied to the coil 35, the voltage applied to the spin torque oscillator 50 is caused to fluctuate. To prevent this, the fluctuating voltage caused by the crosstalk is to be eliminated or reduced by adjusting the parasitic capacitances of the main pole and yoke 40 and the upper pole 42. Here, the suppression effect thereof is increased when no time-based fluctuations occur and the middle electric potential of the high-frequency voltage applied to the coil 35 is zero.

Figure 4:
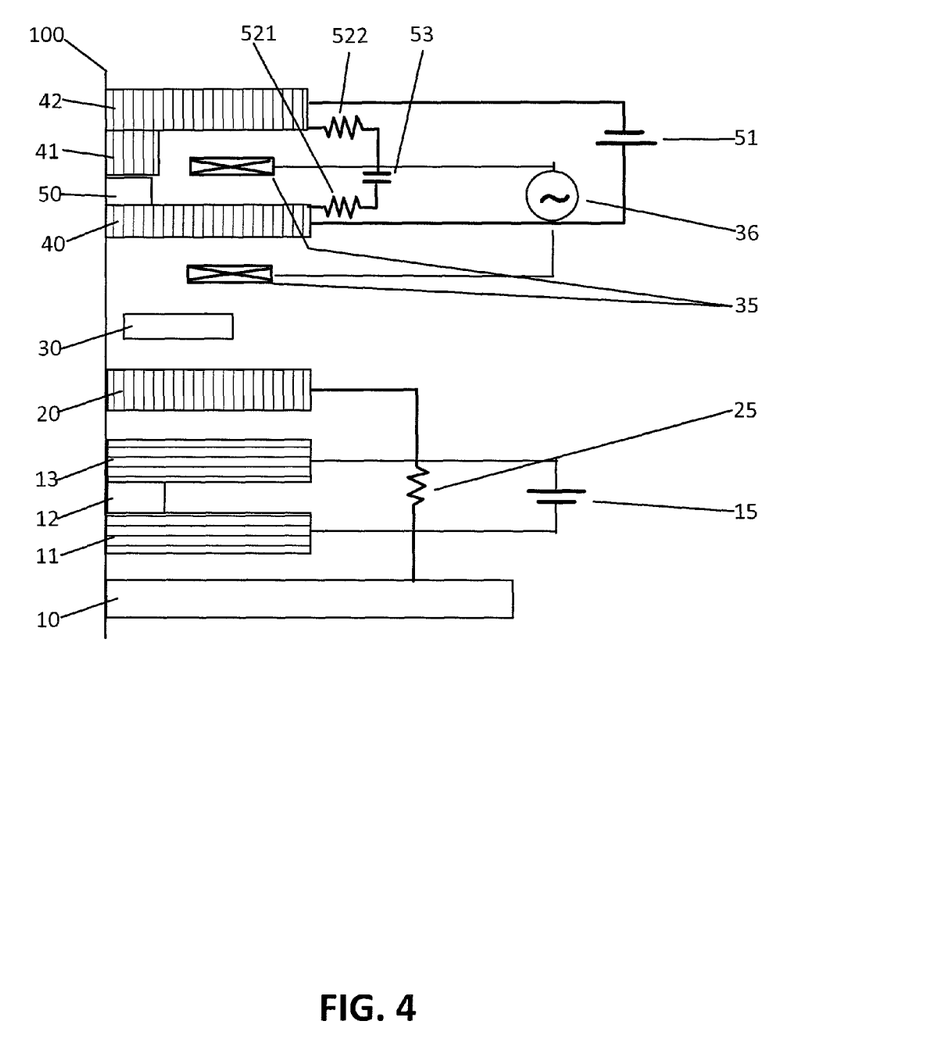
FIG. 4 illustrates an example of electrical connection and the structure of a microwave assisted magnetic recording head with generating a high-frequency magnetic field, in accordance with an embodiment of the present invention.

FIG. 4 shows the electrical connection and structure of the microwave-assisted magnetic recording head of the present technology in a cross-section perpendicular to the air bearing surface thereof. FIG. 4 also shows embodiments of the present technology that overcome the limits of embodiments of FIGS. 2 and 3. Notably, while the diagram illustrates both a read sensor 12 and a spin torque oscillator 50 and, depending on the design of a magnetic storage apparatus, the read sensor 12 is arranged in a different cross-section to the cross-section that incorporates the spin torque oscillator 50, because the relative positional relationship therebetween is not different in discussions of electrical arrangement, the description shall be hereinafter given with reference to diagrams in which these two component parts are arranged in the same cross-section.

A capacitor 53 is electrically connected in parallel with a spin torque oscillator 50 between a main pole and yoke 40 and upper pole 42 by way of a resistor 521 and a resistor 522. The adoption of a structure such as this allows the high-frequency voltage induced to the main pole and yoke 40 and the upper pole 42 serving as the electrodes of the spin torque oscillator 50 to flow to the capacitor 53 and, as a result, for the voltage applied to the spin torque oscillator 50 to be maintained constant. In addition, if a sudden surge occurs, because the surge is released to the capacitor 53 and is not applied to the spin torque oscillator 50, damage to the spin torque oscillator 50 is avoided.

Figure 5:
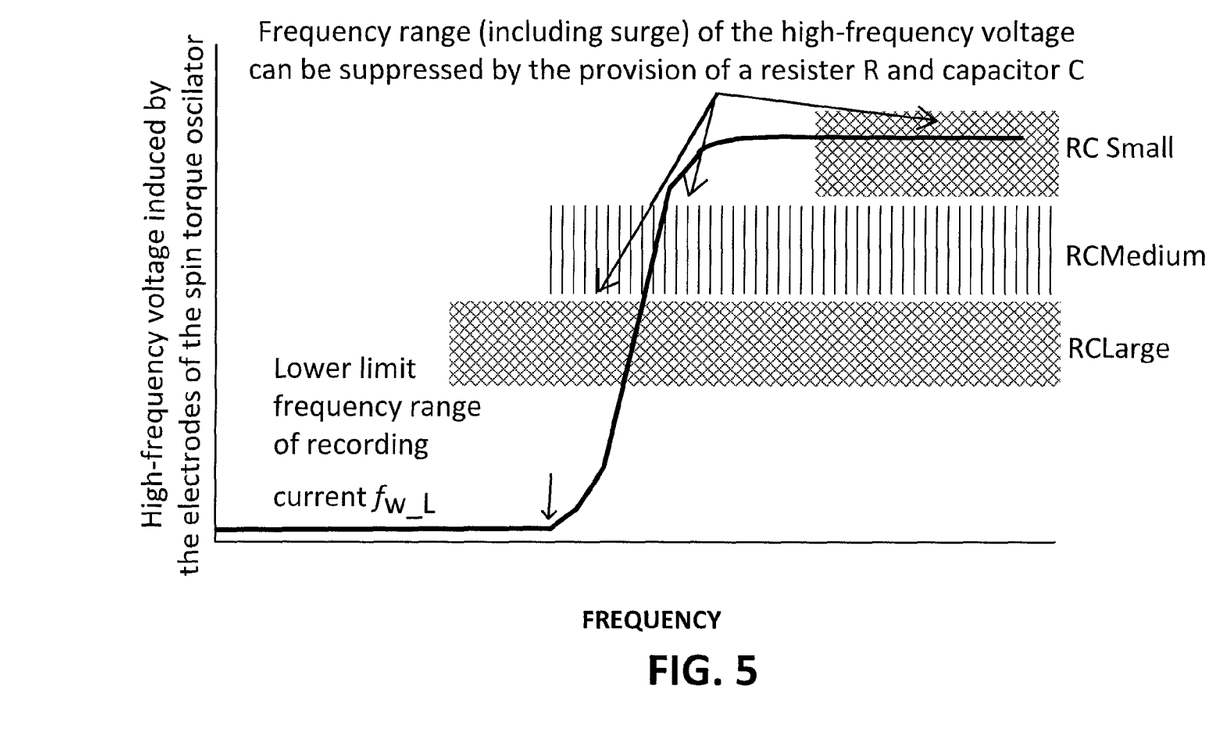
FIG. 5 illustrates an example chart of the setting of the resistance and capacitor capacitance, in accordance with an embodiment of the present invention.

FIG. 5 is an example chart of the setting of the resistance R and the capacitor capacitance C. Notably, R denotes the sum of the resistor 521 and the resistor 522. The effect of the reduction of the high-frequency voltage applied to the spin torque oscillator 50 can be altered according to the magnitude of the product R×C (hereinafter given as RC) of the resistance R and the capacitor capacitance C. More specifically, the frequency of the high-frequency voltage suppressed by the provision of the R and C lies in a higher frequency range than the value $f_c$ determined by Equation 1:

$$f_c = \frac{1}{2\pi RC} \quad \text{EQUATION 1}$$

Taking the lower limit of the frequency of the recording current applied to the coil 35 as $f_{w\_L}$, when RC is small (RC Small in the diagram), an adequate effect cannot be produced because the frequency range at which the impact by the high-frequency voltage can be suppressed is higher than $f_{w\_L}$. By the adoption of an appropriate RC (RC Medium in the diagram), suppression of the impact by a high-frequency voltage can be conferred at frequencies lower than $f_{w\_L}$. In addition, as shown in the diagram, suppression of the impact by a high-frequency voltage may be conferred from an even lower frequency range when the RC is large.

The magnitudes of R and C for obtaining a suppression effect of the impact by the high-frequency voltage, along with the forming means for achieving the R and C, were examined. First, in the case of a mobile hard disk device, an $f_{w\_L}$ was found to be the order of approximately 230 MHz for an areal recording density of the order of 750 Gb/in$^2$, which has some degree of variation attributable to the number of revolutions of the disk or the signal processing system. Based on this, in order to suppress the high-frequency voltage induced to the electrodes of the spin torque oscillator, RC is to be a value larger than approximately 7×10$^{-10}$ Ω·F. An estimate that this value can be realized when leads without intentional resistive element and the capacitor configured in the absence of the employment of a special structure or process is performed. As the lead material, a normal metal material is employed. The lead pathway is essentially or substantially linear, and the effective lead pathway is not lengthened by bending or lengthening the pathway. When the required capacitor electrode area is calculated on the basis of a lead resistance R of 100Ω, a capacitor electrode distance of 200 nm, and the employment of alumina which is often employed as an interlayer insulation film as a dielectric material in a magnetic head, for the purposes of simplicity the adoption of square shape is assumed, and the square has sides of approximately 135 μm. It is difficult to create an area of this size with just the lead used for connecting the resistance R and C, and so a capacitor is to be intentionally provided. When an identical examination was implemented using a server hard disk device, the $f_{w\_L}$ was of the order of approximately 750 MHz, the RC required for obtaining the effect of suppressing a high-frequency voltage was approximately 2×10$^{-10}$ Ω·F and, when determining the capacitor electrode area on the basis of the same assumptions as described above, the square has sides of approximately 75 μm. This size is also difficult to form from just the leads used for connecting the resistance R and C, and a capacitor is to be intentionally provided. Incidentally, when the same calculation is implemented using an $f_{w\_L}$ of the order of approximately 1500 MHz, because the required capacitor electrode area is a square shape of sides approximately 53 μm, even if areal recording densities were to increase in the further, it is not through that the policy necessitating the intentional provision of a capacitor will change.

While the calculation described above assumes the enlargement of the area of all capacitors as a means for obtaining a large RC, another separate means may be adopted. Examples of means for increasing the resistance R include the intentional employment of a material of higher resistivity than the lead material normally employed, bending or lengthening of the lead length or, furthermore, a combination thereof. For example, a metal material to which Ti, β-Ta, metal nitrides, oxides or the like can be used. In addition, examples of means for increasing the capacitor capacitance C include, intentionally narrowing the capacitor electrode distance to the order of several tens of nm rather than to the order of 200 nm which is formed when the main pole and yoke 40 and upper pole 42 are formed by normal means, employing a material having a specific dielectric constant larger than alumina as the dielectric material or, furthermore, a combination thereof. Materials may be, but are not limited to, Hf oxide, Hf oxide to which Si, Al or nitrogen have been added as an additive element, Y oxide, Ta oxide and so on.

In addition, because of the size limitations on the face of the trailing edge side of the magnetic head slider in which the elements are formed, the resistor 521 and resistor 522 may jointly use all or a part of the leads that connect the capacitor 53 with the main pole and yoke 40 and the capacitor 53 with the upper pole 42. In this case, a material of high resistivity as described above is to be adopted, or the lead length is to be lengthened. Regarding the fabrication of a capacitor, while the lead for connecting the capacitor 53 with the main pole and yoke 40 may be employed for the lower electrode of the capacitor 53 and the lead for connecting the capacitor 53 and the upper pole 42 may be employed for the upper electrode of the capacitor 53, the layer-to-layer distance is to be thinned or a high dielectric constant material is to be adopted as the layer-to-layer insulating film.

In this embodiment, the main pole and yoke 40 or the upper pole 42 serving as the electrodes of the spin torque oscillator 50 are not grounded. This is because of current normal technical difficulties and costs, wherein although the difference between the high electric potential and the low electric potential of the high-frequency voltage applied to the coil 35 is constant, the middle electric potential is not prescribed and moreover, time-based variations in the coil electric potential occur and, as a result, the voltage induced to the electrodes, at main pole and yoke 40, upper pole 42, of the spin torque oscillator 50 similarly varies. When the main pole and yoke 40 or the upper pole 42 are grounded, electric potential variations of the coil 35 cause equivalent variations in the potential difference between the electrodes, at main pole and yoke 40 and upper pole 42, of the spin torque oscillator 50. These variations in the electric potential difference between the electrodes of the spin torque oscillator 50 are suppressed when the electrodes of the spin torque oscillator 50 are floating rather than grounded.

Notably, the polarity of the read sensor power supply 15 and the STO power supply 51 as represented in the diagrams serve as one example thereof, and the effects of this patent are unchanged irrespective of the polarity shown therein. In addition, a fixed effect is able to be produced even in the absence of a lower pole grounding resistor 25.

Figure 6:
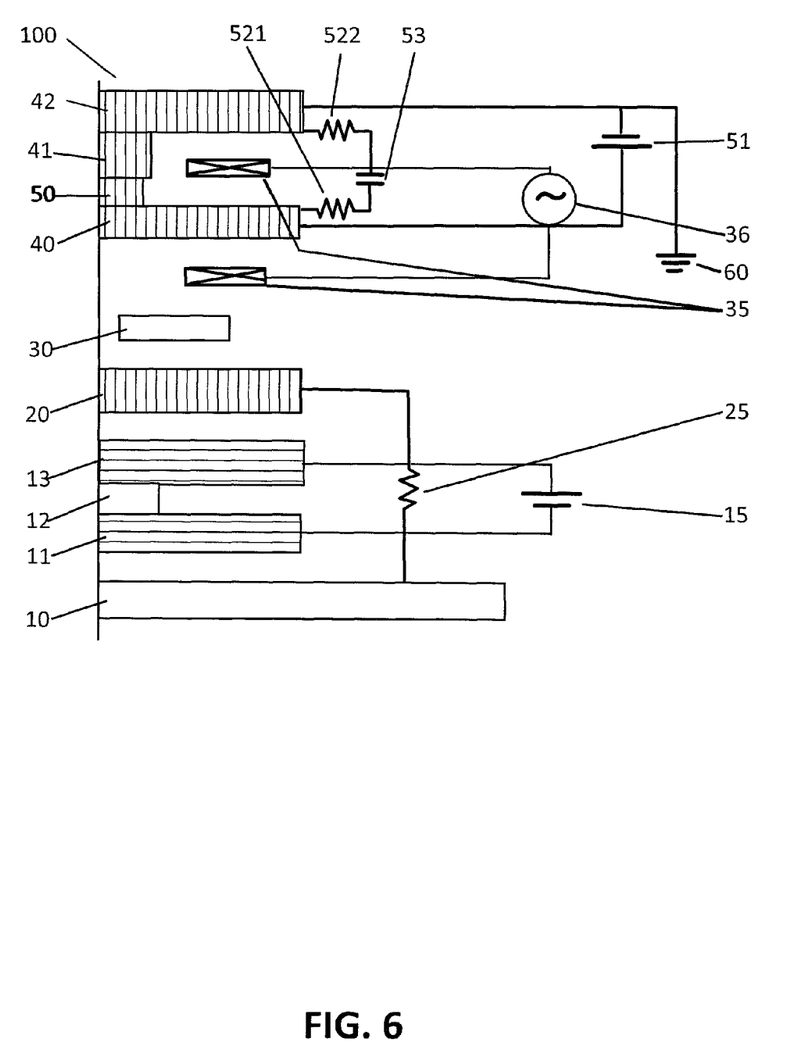
FIG. 6 illustrates an example of electrical connection and the structure of a microwave assisted magnetic recording head with generating a high-frequency magnetic field, in accordance with an embodiment of the present invention.

FIG. 6 shows the structure and electrical connection of a microwave-assisted magnetic recording head of the present technology in a cross-section perpendicular to the air bearing surface thereof. As shown in FIG. 4, in this configuration the low electric potential side of the STO power supply 51, that is to say, the upper pole 42, is ground 60. In one embodiment, this structure is favorable to be adopted when the middle electric potential of the high-frequency voltage applied to the coil 35 is set at the zero electric potential.

Here, the polarity of the STO power supply 51 and the grounded electrode serve as one example only and, depending on the electrical design such as the design of the read/write IC and the configuration of the spin torque oscillator 50, the STO power supply 51 may have an opposite polarity, and the main pole and yoke 40 may be ground. Notably, grounding the upper pole 42 furthest from the slider substrate 10 reduces the likelihood that the performances of the microwave-assisted magnetic recording head will be affected by outer disturbance noise.

Figure 7:
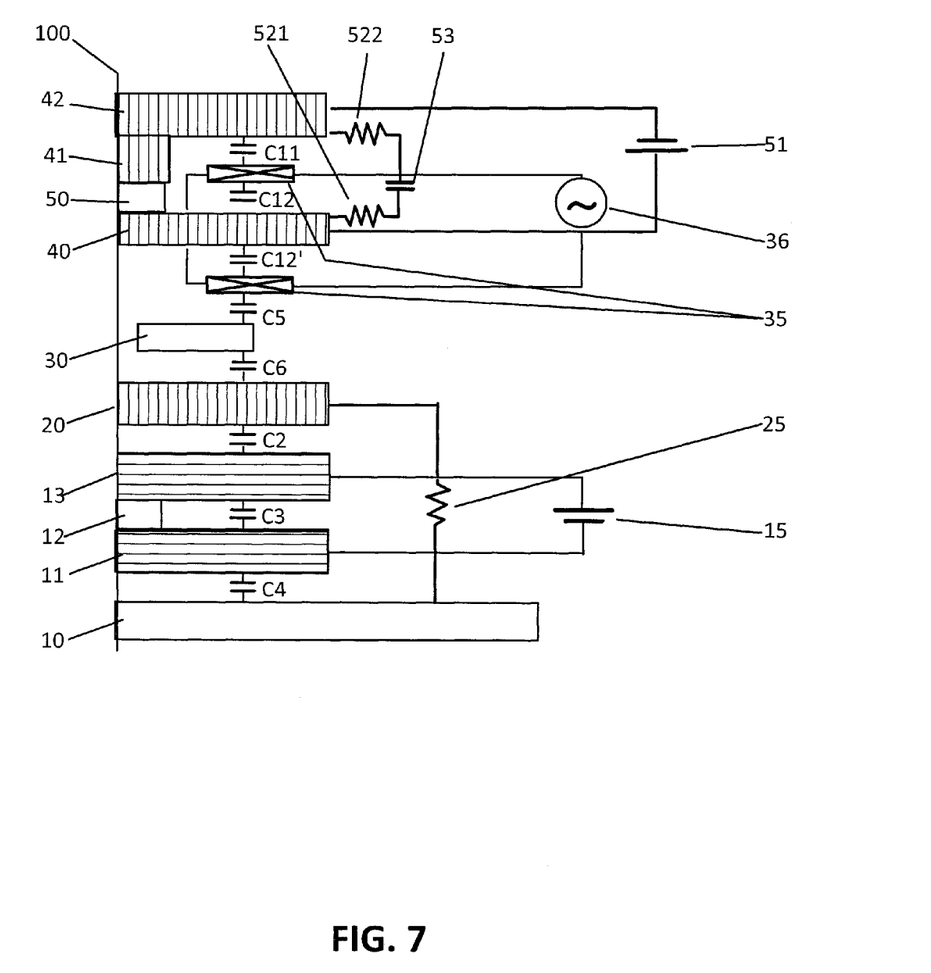
FIG. 7 illustrates an example of electrical connection and the structure of a microwave assisted magnetic recording head with generating a high-frequency magnetic field, in accordance with an embodiment of the present invention.

FIG. 7 shows the structure of the microwave-assisted magnetic recording head of the present technology in a cross-section perpendicular to the air bearing surface thereof, and additionally shows the electrical connection thereof including the capacitance between constituent regions. C2, C3 and C4 denote the capacitance pertaining to the read elements. From the slider substrate 10, the capacitance between the slider substrate 10 and the lower shield layer 11 is denoted by C4, the capacitance between the lower shield layer 11 and upper shield layer 13 is denoted by C3, and the capacitance between the upper shield layer 13 and the lower pole 20 is denoted by C2. From the standpoint of producing read performance resistant to cross-talk and disturbance noise, a capacitance balance is favourable to be ensured. C6 denotes the capacitance between the lower pole 20 and the heater for dynamic flying control 30, and C5 denotes the capacitance between the heater for dynamic flying control 30 and the coil 35.

In a microwave-assisted magnetic recording head, the capacitance pertaining to the electrode of the spin torque oscillator 50 should be considered. That is to say, a capacitance C12' of the lower coil and the main pole and yoke 40, a capacitance C12 of the main pole and yoke 40 and the upper coil, and a capacitance C11 between the coil 35 and the upper pole 42. While FIG. 7 assumes a helical coil in which a coil is wound around the main pole and yoke 40, as shown in FIG. 8, a dual pancake coil in which separate coils are wound above and below the main pole and yoke 40 may be similarly considered.

Charging of these capacitances occur when a high-frequency recording voltage is applied to the coil 35. As a result, while an electric potential is respectively produced therein, a voltage of this difference in electric potentials is added to the voltage of the STO power supply 51 and, as a result, the voltage applied to the spin torque oscillator 50 changes. Here, because the electric potential difference is generated as a cross-talk that varies correspondingly to the voltage applied to the coil 35, time variations also occur.

The generation of this surplus difference in electric potential and variations thereof can be suppressed by achieving a balance between the capacitances pertaining to the main pole and yoke 40 and the capacitance pertaining to the upper pole 42. The capacitances pertaining to the coil are precisely determined by integration, for a simple explanation, the capacitance produced by the main pole and yoke 40 and the coil 35 is denoted by C12+C12' and the capacitance between the coil 35 and the upper pole 42 is denoted by C11. Ensuring the ratio of (C12+C12')/C11 between 0.6 and 1.4, in one example between 0.9 and 1.1, can suppress variations in the voltage applied to the spin torque oscillator 50 and stably operate the spin torque oscillator 50.

Figure 8:
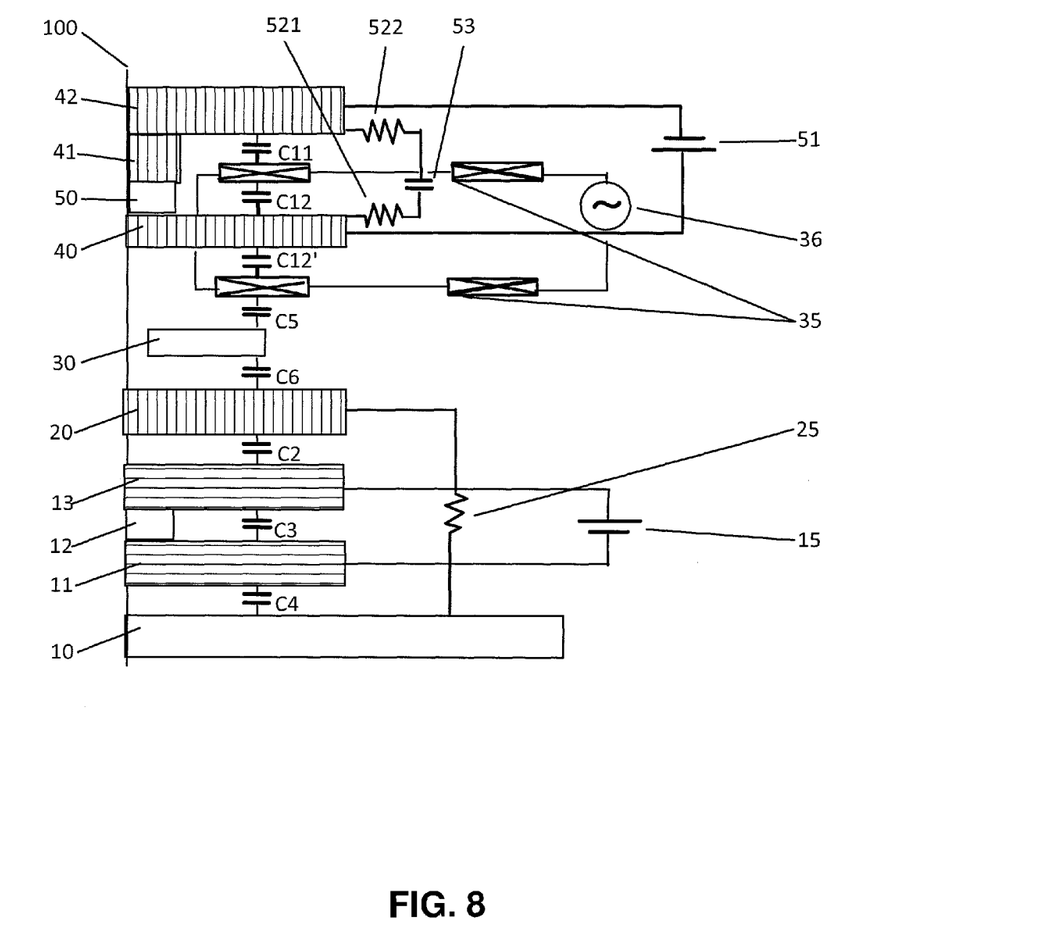
FIG. 8 illustrates an example of electrical connection and the structure of a microwave assisted magnetic recording head with generating a high-frequency magnetic field, in accordance with an embodiment of the present invention.

Notably, as shown in FIG. 7 and FIG. 8, while the capacitor 53 is electrically provided in parallel with the spin torque oscillator 50 by way of the resistor 521 and resistor 522, the generation of a surplus difference in electric potential as described above and the variations thereof can be suppressed in the absence of the provision thereof.

Figure 9:
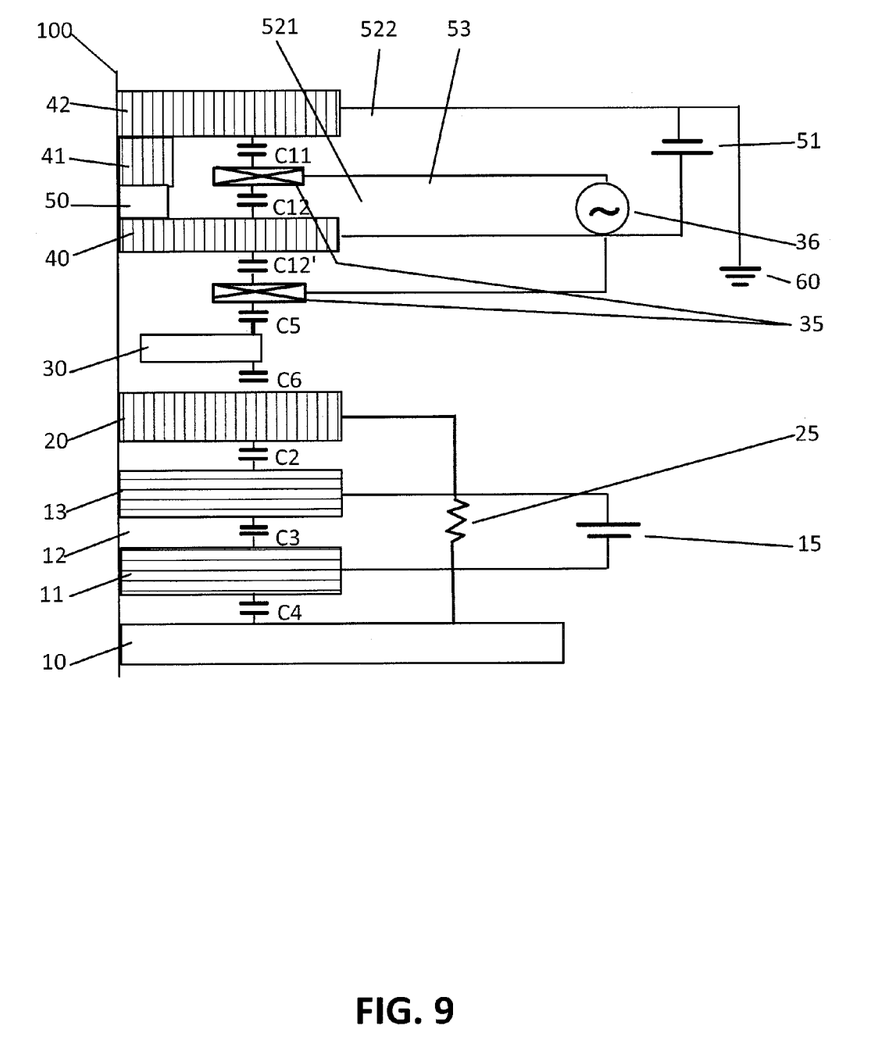
FIG. 9 illustrates an example of electrical connection and the structure of a microwave assisted magnetic recording head with generating a high-frequency magnetic field, in accordance with an embodiment of the present invention.

FIG. 9 shows the structure of the microwave-assisted magnetic recording head of the present technology and the electrical connection including the capacitance between the constituent regions in a cross-section perpendicular to the air bearing surface. In FIG. 9, the low electric potential side of the STO power supply 51, that is to say, the upper pole 42 is grounded. In one embodiment, the adoption of this structure is favourable to be adopted when the middle electric potential of the voltage applied to the coil 35 is set to a zero electric potential.

Here, the polarity of the STO power supply 51 and the grounded electrode serve as one example only and, depending on the electrical design such as the design of the read/write IC and the configuration of the spin torque oscillator 50, the STO power supply 51 may have an opposite polarity, and the main pole and yoke 40 may be ground. In addition, while the capacitor 53 is provided electrically in parallel with the spin torque oscillator 50 by way of the resistor 521 and the resistor 522, these need not be provided and without this, irrespective of the provision thereof, the generation of a surplus difference in electric potential between the spin torque oscillator 50 electrodes and the variations thereof can be suppressed.

Notably, grounding of the upper pole 42 which is the furthest distance from the slider substrate 10 reduces the likelihood that the performances of the microwave-assisted magnetic recording head will be affected by outer disturbance noise.

What is claimed is:

1. A magnetic recording head for microwave-assisted magnetic recording, comprising:
    a magnetic recording head for applying a magnetic field from a main pole of said magnetic recording head for recording data to a disk;
    a spin torque oscillator adjacent to said magnetic recording head for generating a high-frequency magnetic field at a stable frequency and amplitude, wherein a direct current voltage is applied to said spin torque oscillator via a power supply; and
    a capacitor connected to an upper electrode of said spin torque oscillator via a first resistor and said capacitor also connected to a lower electrode of said spin torque oscillator via a second resistor, wherein
    the first resistor, the capacitor, and the second resistor are electrically connected in series, in this order.

2. The magnetic recording head as recited in claim 1 wherein said magnetic recording head accomplishes said recording data to said disk by taking a lower limit frequency for said recording as $f_{w\_L}$, a resistance value of said first resistor and said second resistor as R, and a capacitance of said capacitor as C, a product RC of R and C is $RC>1/(2\pi rf_{w\_L})$.

3. The magnetic recording head as recited in claim 1 wherein a portion of said upper electrode of said spin torque oscillator constitutes an upper pole and a portion of said lower electrode of said spin torque oscillator constitutes a main pole.

4. The magnetic recording head as recited in claim 1 wherein one of either said upper electrode or said lower electrode of the spin torque oscillator is electrically grounded.

5. The magnetic recording head as recited in claim 1 wherein a ratio of a parasitic capacitance pertaining to said upper electrode to said lower electrode of said spin torque oscillator is between 0.6 and 1.4.

6. The magnetic recording head as recited in claim 1 wherein a ratio of a parasitic capacitance ratio pertaining to said upper electrode to said lower electrode of said spin torque oscillator is between 0.9 and 1.1.

7. The magnetic recording head as recited in claim 1 wherein a helical coil is wound around said main pole.

8. The magnetic recording head as recited in claim 1 wherein separate coils of a dual pancake coil are wound above and below said main pole.

9. A disk drive for microwave-assisted magnetic recording, comprising:
    a housing;
    a disk in said housing for storing data;
    a magnetic recording head for applying a magnetic field from a main pole of said magnetic recording head for recording said data to said disk;
    a spin torque oscillator adjacent to said magnetic recording head for generating a high-frequency magnetic field at a stable frequency and amplitude, wherein a direct current voltage is applied to said spin torque oscillator via a power supply; and
    a capacitor connected to an upper electrode of said spin torque oscillator via a first resistor and said capacitor also connected to a lower electrode of said spin torque oscillator via a second resistor, wherein
    the first resistor, the capacitor, and the second resistor are electrically connected in series, in this order.

10. The magnetic recording head as recited in claim 9 wherein said magnetic recording head accomplishes said recording data to said disk by taking a lower limit frequency for said recording as $f_{w\_L}$, a resistance value of said first resistor and said second resistor as R, and a capacitance of said capacitor as C, a product RC of R and C is $RC>1/(2\pi rf_{w\_L})$.

11. The magnetic recording head as recited in claim 9 wherein a portion of said upper electrode of said spin torque oscillator constitutes an upper pole and a portion of said lower electrode of said spin torque oscillator constitutes a main pole.

12. The magnetic recording head as recited in claim 9 wherein one of either said upper electrode or said lower electrode of the spin torque oscillator is electrically grounded.

13. The magnetic recording head as recited in claim 9 wherein a ratio of a parasitic capacitance pertaining to said upper electrode to said lower electrode of said spin torque oscillator is between 0.6 and 1.4.

14. The magnetic recording head as recited in claim 9 wherein a ratio of a parasitic capacitance pertaining to said upper electrode to said lower electrode of said spin torque oscillator is between 0.9 and 1.1.

15. The magnetic recording head as recited in claim 9 wherein a helical coil is wound around said main pole.

16. The magnetic recording head as recited in claim 9 wherein separate coils of a dual pancake coil are wound above and below said main pole.

17. A magnetic recording head for microwave-assisted magnetic recording, comprising:
    a magnetic recording head for applying a magnetic field from a main pole of said magnetic recording head for recording data to a disk;

a spin torque oscillator adjacent to said magnetic recording head for generating a high-frequency magnetic field at a stable frequency and amplitude, wherein a direct current voltage is applied to said spin torque oscillator via a power supply; and a capacitor connected to an upper electrode of said spin torque oscillator via a first resistor and said capacitor also connected to a lower electrode of said spin torque oscillator via a second resistor, and wherein a portion of said upper electrode of said spin torque oscillator constitutes an upper pole and a portion of said lower electrode of said spin torque oscillator constitutes a main pole, and wherein the first resistor, the capacitor, and the second resistor are electrically connected in series, in this order.

18. The magnetic recording head as recited in claim 17 wherein said magnetic recording head accomplishes said recording data to said disk by taking a lower limit frequency for said recording as $f_{w\_L}$, a resistance value of said first resistor and said second resistor as R, and a capacitance of said capacitor as C, a product RC of R and C is $RC > 1/(2\pi r f_{w\_L})$.

19. The magnetic recording head as recited in claim 9 wherein one of either said upper electrode or said lower electrode of the spin torque oscillator is electrically grounded.

20. The magnetic recording head as recited in claim 9 wherein a ratio of a parasitic capacitance ratio pertaining to said upper electrode to said lower electrode of said spin torque oscillator is between 0.6 and 1.4.

* * * * *